INVENTORS
William H. Payne
Ralph E. Henry
BY
Popp and Sommer
ATTORNEYS

United States Patent Office 3,402,913
Patented Sept. 24, 1968

3,402,913
VALVE ASSEMBLY FOR ENGINE
William H. Payne, Olean, N.Y., and Ralph E. Henry, Rixford, Pa., assignors to Dresser Industries, Inc., Dallas, Tex., a corporation of Delaware
Division of application Ser. No. 341,565, Jan. 31, 1964. Continuation-in-part of application Ser. No. 36,644, June 16, 1960. This application June 27, 1966, Ser. No. 590,109
2 Claims. (Cl. 251—63.6)

ABSTRACT OF THE DISCLOSURE

A valve assembly for an engine power cylinder includes a poppet valve closure member having a head and stem, the head seating on a valve seat opening to the cylinder, and the valve being opened by movement of the closure member into the cylinder. The actuator for opening the valve includes a piston attached to the poppet stem and reciprocable within a cylinder, the face of the piston remote from the valve stem being exposed to an actuator chamber. The actuator chamber is communicated with a source of hydraulic fluid by means of a fluid passageway, the opening of the fluid passageway into the actuator chamber defining a shoulder. A tubular member is disposed partially in the passageway and partially in the chamber defining an annular passage and an internal passage opening to the actuator chamber. An annular check valve closure member is slidable on the exterior of the tubular member and is urged by a spring against the shoulder to permit fluid flow through the annular passage only into the actuator chamber. The actuator piston is provided with a plunger which is received into the internal passage of the tubular member providing a restricted passage to flow of hydraulic fluid snubbing the terminal return movement of the actuator piston and valve closure member. The main valve closure member is continuously urged to the closed position by a spring. During return movement of the closure member, fluid flow from the actuator chamber is initially restricted to flow through the central passage, and this flow is further restricted when the piston plunger enters this passage. The position of the tubular member is longitudinally adjustable, to pre-adjust the snubbing action of the valve closure member.

---

This application is a division of copending application Ser. No. 341,565, filed Jan. 31, 1964, now Patent No. 3,314,337; and the last named application is a continuation-in-part of copending application Ser. No. 36,644, filed June 16, 1960, now Patent No. 3,150,565.

This application is a continuation-in-part of copending application Serial No. 36,644, filed June 16, 1960.

The features of the invention are particularly advantageously employed in expansion engines applied in the liquefaction of cryogenic gases such as air or nitrogen, although the engines may be used in other processing applications.

With an expansion engine used for gas liquefaction, for example, the gas at an elevated pressure is introduced into a cylinder closed at one end by a reciprocable piston and the gas is allowed to expand against the piston to move the same and develop power. The work done by the expandiing gas reduces its pressure and temperature, as is desired, and following the power stroke of the piston the expanded gas is exhausted from the cylinder. The admission and exhausting of the gas is controlled by valves.

Considering the admission or intake valve, for example, it is desired to open this valve quickly when the piston is essentially at the rest or at top dead center. The time this valve remains open determines the power developed. The longer the valve is left open, the greater the power, and the shorter it is left open, the less the power. It is most important to close the intake valve rapidly so as to reduce throttling. No work is performed if energy is dissipated in throttling the gas resulting in a loss of power.

If mechanical means are employed in an attempt to actuate the valves quickly the mechanical parts must be large to develop the forces required and since the parts are physically large and heavy, inertia forces resist their quick acceleration.

Accordingly, it is an important object of the present invention to provide intake and exhaust poppet valves for an expansion engine which are actuated quickly by other than mechanical means so that inertia forces which impede the quick movement of mechanical parts are obviated. This is achieved by hydraulically actuating the valves.

Another object is to provide such an expansion engine which is trouble-free in operation and durable so as to avoid down time for repairs and to give lasting service.

Other objects and advantages of the present invention will be apparent from the following detailed description of a preferred embodiment shown in the accompanying drawings in which:

FIG. 3 is an enlarged vertical central longitudinal sectional view through the left one of the reciprocating expanders shown in FIG. 1, this view being taken on line 3—3 of FIG. 1.

FIG. 4 is a still further enlarged central longitudinal sectional view of the piston and cylinder arrangement shown in FIG. 3.

FIG. 1 is a longitudinal sectional view of an exhaust valve assembly for an engine.

FIG. 2 is an enlarged fragmentary view similar to FIG. 1 and showing the actuator fluid check valve in an open condition, this valve forming part of a snubbing means.

Figures 1, 2:
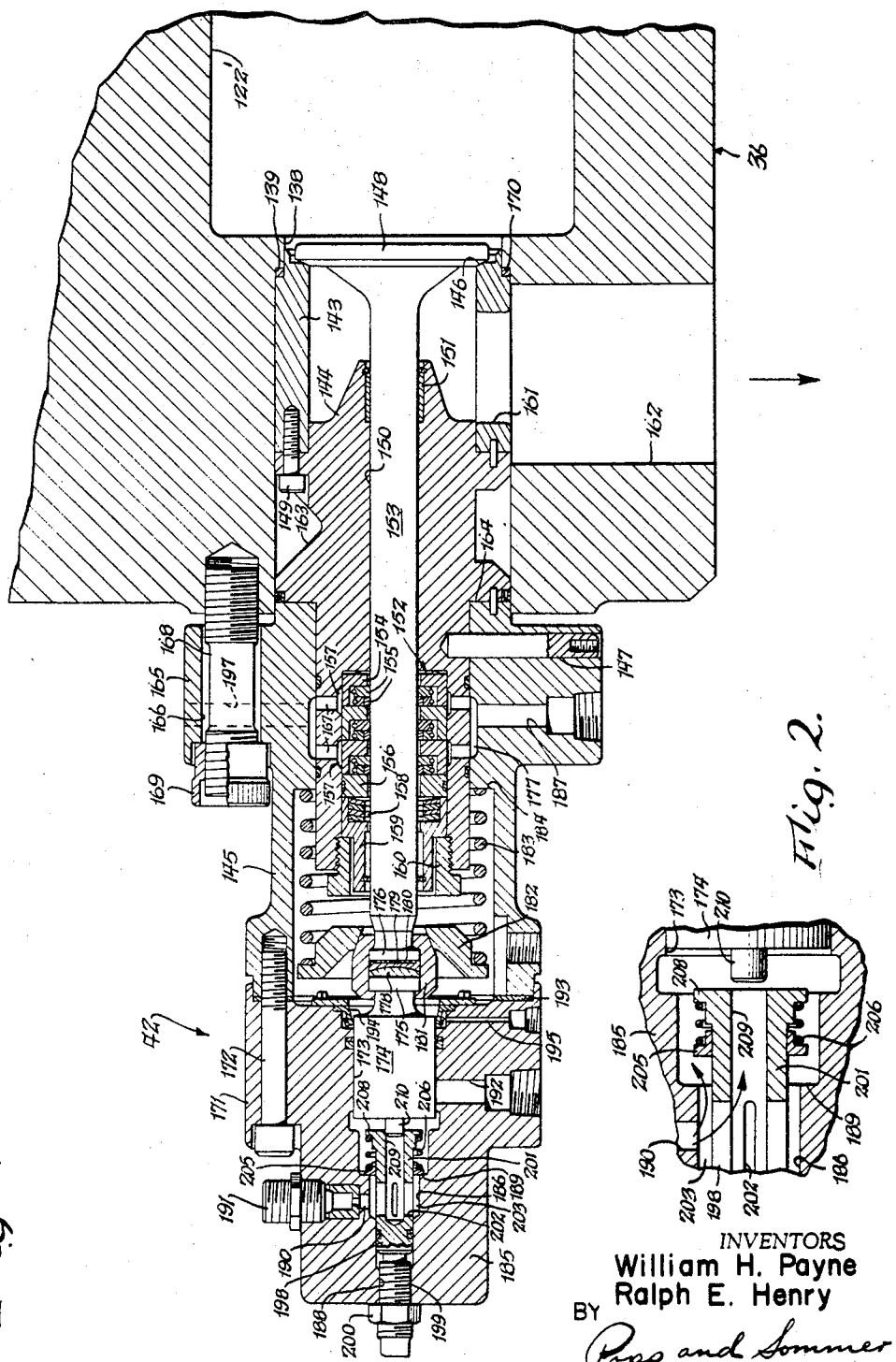
FIG. 1 is a top plan view of an expansion engine having a pair of reciprocating expanders, each of which is constructed in accordance with the principles of the present invention.
FIG. 2 is a front elevational view thereof.

Referring to the drawings, an exhaust valve assembly designated generally 42 is mounted on a cylinder head 36. The cylinder head 36 is shown as provided with a horizontal through passage 138 which is counterbored to provide an outwardly facing shoulder 139 on which the exhaust valve assembly 42 is mounted as hereinafter explained. This passage 138 communicates with the inner end of cylinder head recess 122'.

Referring to FIG. 1, exhaust valve assembly 42 is shown as comprising interfitting inner, intermediate and outer body members 143, 144 and 145, respectively. Inner body member 143 at one end is formed to provide a seat 146 on which the head of a poppet valve 148 is adapted to seat. The member 143 is in the form of a sleeve mounted on the inner end of intermediate body member 144 and secured thereto as by a series of circumferentially spaced longitudinally disposed screws 149. The intermediate body member 144 is shown as having a throughbore 150 counterbored at its inner end to receive a bushing 151 and counterbored at its outer end to receive a non-lubricated stuffing box assembly indicated generally at 152. Poppet valve 148 has a stem 153 which slides on bushing 151 and extends through stuffing box assembly 152. Stuffing box assembly 152 may be of any suitable construction and is shown as comprising a plurality of packing devices, three such devices being shown and each including a packing cup 154 in the recess of which a pair of packing rings 155 are arranged with a garter spring embracing each ring. The stack of three such packing devices is closed by a retainer ring 156 against which a plurality of belleville springs 158 are arranged, these springs being housed in the recess of a packing gland 159, in turn held in place by a packing gland nut 160. It will be seen that by tightening the nut 160, the belleville springs 158 are flattened so as to compress the packing devices. The rings 155 of these packing devices are compressed by the garter springs into sealing engagement with the surface of valve stem 153. These packing rings 155 and the bushing 151 are preferably made of a self-lubricating material such as a long chain fluorinated polymer of ethylene.

Inner body member 143 is shown as formed with a hole 16 in its side wall which communicates with lateral horizontal exhaust passage 162 provided in cylinder head 36. When exhaust valve 148 is unseated cylinder head recess 122' is placed in communication with exhaust passage 162 via connected passages 138 and the interior of tubular inner body member 143. The outer end of horizontal passage 162 may be suitably connected to a pipe (not shown) which serves as an exhaust conduit for the gas which has been expanded in the engine.

To prevent excessive heat flow longitudinally of valve assembly 42, intermediate body member 144 is provided with an external groove 163 which provides a heat dam.

Outer body member 145 in part surrounds the outer portion of intermediate body member 144. The inner end face of outer body member 145 bears against a shoulder 164 formed on inner body member 143. Member 145 also has an integral annular attaching flange 165 which is provided with a series of circumferentially spaced counterbored through holes 166. A stud 168 extends through each such hole, the inner end of the stud being secured to cylinder head 36 and the outer end having threadedly mounted thereon a nut 169 which bears against the shoulder formed on the attaching flange 165 by reason of the counterbored hole 166. It will be seen that by tightening the nuts 169, the outer body member 145 is clamped against shoulder 164 of intermediate body member 144 which in turn forces inner body member 143 against shoulder 139 a suitable metallic gasket 170 being provided therebetween.

Intermediate and outer body members 144 and 145 respectively are shown fastened together by a lock pin 147 which is partly arranged in a radial hole extending through outer body member 145 including its flange portion 165, the inner end portion of this lock pin extending into a radial recess registering with said radial hole.

Means are provided for circulating a heating fluid such as hot water around the stuffing box assembly 152 so that seal rings 155 will remain flexible and conformable to valve stem 153 for effective sealing. While such means may be variously construed, the same is shown as including a pair of annular chambers 157, surrounding packing cups 154 and formed by internal annular grooves in intermediate body member 144. Each such chamber 157 communicates via a plurality of circumferentially spaced radial holes 167 in intermediate body member 144 with an outer manifold chamber 177 formed by an internal annular groove in outer body member 145. This manifold chamber 177 has a suitably circumferentially spaced inlet and outlet 187 and 197, respectively, for attachment to supply and drain conduits (not shown).

Actuator means are provided for opening exhaust valve 148. As shown, such actuator means comprises an actuator cylinder member 171 which abuts the outer end face of outer body member 145 and is secured thereto as by a series of circumferentially spaced screws 172. The outer cylinder 171 is provided with a recess leading from the inner end face of the cylinder to provide a chamber 173 in which an actuator piston 174 is slidably arranged. One end of this piston 174 has a headed extension 175 which opposes a headed extension 176 on the end of valve stem 153. Arranged between the spaced apart and opposing end faces of these headed ends 175 and 176 are a pair of alining blocks 178 and 179, one of these blocks being provided with a spherical convex surface engaged by a complementary concave surface formed on the other block. One or more shims 180 may be provided between one of the alining blocks and one of the headed ends so as to take up any clearance between inturned end portions of a split coupling ring 181 which overlap the shoulders on these headed ends. Surrounding the split ring 181 is an annular spring retainer 182. A helical compression spring 183 is shown as operatively arranged between the retainer 182 and a shoulder 184 formed on the outer body member 145.

The outer end wall 185 of the actuator cylinder 171 is provided with a stepped throughhole 186 having an outer internally threaded portion 188 of reduced diameter and at an inward location also formed to provide an inwardly facing annular shoulder 189. The hole 186 communicates with a later branch hole or inlet conduit 190 to which the passage of a fitting 191 mounted on the cylinder end wall 185 is connected. Fluid admitted through fitting 191 passes through connected passages 190, 186 and into the chamber 173 where it drives actuator piston 174 rightward as viewed in FIG. 5A so as to open valve 148. Actuator piston 174 will move in such rightward direction until the trailing or left end of this piston uncovers a relief port 192 extending laterally from actuator chamber 173 and communicating therewith at a location spaced axially inwardly from the inlet end of chamber 173. Such axial spacing will determine at least grossly the extent of lift of the valve when unseated. This can be finally controlled by inserting the desired shims 193 betwen the opposing end faces of actuator cylinder member 171 and outer body member 145.

Suitable seal means are shown at 194 for preventing leakage of actuator fluid past actuator piston 174. While any suitable means 194 may be employed, that shown comprises a flexible tubular element having one end sealed to the actuator cylinder member 171 and its other end wipingly engaging the periphery of actuating piston 174. Leaking actuator fluid is drained through a drain port 195.

While fluid is utilized to open valve 148, the spring 183 is utilized to return the valve to a seated condition when this is permitted. In order to prevent the valve 148 from slamming against its seat 146, snubbing means are provided for controlling the terminal return movement of the actuator piston 174. Such snubbing means will now be described.

The snubbing means are shown as including a plug member 198 slidably arranged in hole 186 axially outwardly of the lateral inlet conduit 190. This plug member is formed integrally with an outer externally threaded stem portion 199 which is screwed into the threaded hole portion 188. Rotation of this stem 199 relative to end wall 185 shifts the axial position of plug member 198. A lock nut 200 arranged on the exposed portion of the threaded stem 188 and bearing against the outer end face of end wall 185 serves to hold this stem and the associated plug member 198 in the desired adjusted position. The inner end of plug member 198 is formed with an axially and inwardly extending tubular portion 201 the inner open end of which communicates with chamber 173 and at its outer end has a plurality of radial passages 202 therethrough to establish communication with lateral inlet conduit 190. The portion of hole 186 surrounding the tubular portion 201 is enlarged to provide an annular space 203 which communicates at opposite ends with chamber 173 and inlet conduit 190.

Check valve means are provided for permitting the flow of fluid through annular space 203 only toward cylinder chamber 173. Such means are shown as including an annular check valve 205 slidably arranged on the exterior of tubular portion 201 and movable away from and toward the annular shoulder 189 which forms a seat therefor. A preloaded helical compression spring 206 is shown as surrounding the tubular portion 201 and at one end bears against check valve 205 and at its other end bears against an integral enlarged head 208 formed on the inner end of the tubular portion 201. This tubular portion has a centrally located cylindrical bore 209 adapted to receive a throttling rod or plunger 210 carried by the actuator piston 174. The periphery of the throttling rod 210 has the desired clearance with respect to the wall surface of cylindrical bore 209 so that when the throttling rod enters or plunges into this bore the clearance between the opposing surfaces provides a restricted passage for the flow of hydraulic fluid from cylinder 171 into bore 209, such flow being effectively throttled and thereby snubbing the terminal return movement of the actuator piston.

On the other hand, when hydraulic fluid flows toward cylinder chamber 173, such fluid enters through branch inlet conduit 190 and flows into annular passage 203 as well as passing raidially inwardly through radial passages 202 into bore 209, as illustrated in FIG. 2. The pressure of the incoming fluid bears against check valve 205 and lifts it off its seat 189 against the urging of return spring 206. Thus a quick filling of actuator cylinder chamber 173 is effected resulting in a quick opening of exhaust valve 148.

What is claimed is:

1. A valve assembly for an expansion engine comprising a valve, actuator means for said valve including a chamber and a piston slidable therein, a fluid conduit communicating with one end of said chamber for supplying fluid to move said piston in a direction to open said valve, means for continuously urging said piston in the opposite direction to close said valve; characterized by means for snubbing the closing of said valve including: a tubular member arranged in said conduit and spaced from the surrounding wall thereof to provide a free-flowing annular passage and a free-flowing internal passage both communicating at one end with said chamber; check valve means in said annular passage for permitting the flow of fluid therethrough only toward said chamber, including a shoulder in said conduit arranged intermediate the ends of said tubular member, a movable closure engaging said shoulder and movable away therefrom, and spring means constantly urging said closure toward said shoulder; and a throttling element carried by said piston and adapted to plunge into said one end of said internal passage to throttle fluid flowing from said chamber into said passage.

2. The valve assembly set forth in claim 1 characterized by means for shifting the position of said tubular member relative to said chamber, thereby to vary the extent to which said piston throttling element plunges into said internal passage.

References Cited

UNITED STATES PATENTS

| | | | |
|---|---|---|---|
| 1,704,513 | 3/1929 | Pfeifer | 137—516.23 |
| 2,516,247 | 7/1950 | Nuenemann | 251—48 |
| 2,804,086 | 8/1957 | Johnston | 137—516.23 |
| 2,830,784 | 4/1958 | Placette | 251—50 |
| 3,054,384 | 9/1962 | Darling | 91—26 |
| 3,150,562 | 9/1964 | Allgeyer | 91—26 |
| 3,171,328 | 3/1965 | Hennells | 91—26 |
| 3,235,085 | 2/1966 | Humbert | 137—516.23 |

MARTIN P. SCHWADRON, *Primary Examiner.*

B. L. ADAMS, *Assistant Examiner.*